United States Patent
Luick

(10) Patent No.: US 7,200,773 B2
(45) Date of Patent: Apr. 3, 2007

(54) REPRODUCING ERRORS VIA INHIBIT SWITCHES

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/758,586

(22) Filed: Jan. 15, 2004

(65) Prior Publication Data

US 2005/0188264 A1 Aug. 25, 2005

(51) Int. Cl.
*G06F 11/00* (2006.01)

(52) U.S. Cl. .......................... 714/25; 714/34; 712/227

(58) Field of Classification Search .................. 714/25, 714/34; 712/227
See application file for complete search history.

(56) References Cited

U.S. PATENT DOCUMENTS

| 4,821,269 A * | 4/1989 | Jackson et al. ............. 714/724 |
|---|---|---|
| 6,125,465 A * | 9/2000 | McNamara et al. ........ 714/733 |
| 6,145,102 A * | 11/2000 | Klein et al. .................... 714/47 |
| 6,223,305 B1 * | 4/2001 | Simmons et al. ............. 714/34 |
| 6,487,677 B1 * | 11/2002 | Jantz et al. ..................... 714/2 |
| 7,051,242 B2 * | 5/2006 | Naffziger ...................... 714/47 |
| 2002/0194548 A1 * | 12/2002 | Tetreault ....................... 714/43 |
| 2003/0014618 A1 * | 1/2003 | Cabezas et al. ................ 713/1 |

* cited by examiner

*Primary Examiner*—Robert W. Beausoliel
*Assistant Examiner*—Emerson Puente
(74) *Attorney, Agent, or Firm*—Owen J. Gamon

(57) ABSTRACT

A method, apparatus, system, and signal-bearing medium that in an embodiment detect an error, disable selected functions of a computer system via inhibit switches in response to the error, issue a set of diagnostic instructions to a processor, and incrementally enable the selected functions until the error is reproduced. In this way, the source of the error may be determined.

15 Claims, 4 Drawing Sheets

REPRODUCING ERRORS VIA INHIBIT SWITCHES

FIELD

This invention generally relates to digital processing hardware and more specifically relates to problem determination via inhibit switches.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, and communication lines coupled to a network. The CPU is the heart of the system. It executes the instructions that comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But, each operation is performed very quickly. Programs that direct a computer to perform massive numbers of these simple operations give the illusion that the computer is doing something sophisticated. What is perceived by the user as a new or improved capability of a computer system is made possible by performing essentially the same set of very simple operations, but doing it much faster and with different data. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking and combining components, eventually packaging the entire processor as an integrated circuit on a single chip. The reduced size made it possible to increase the clock speed of the processor, and accordingly increase system speed.

In addition to increasing clock speeds, it is possible to improve system throughput by using multiple copies of certain components, and in particular, by using multiple CPUs. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

Most modern processor employ concepts of pipelining and parallelism to increase the clock speed and/or the average number of operations executed per clock cycle. Pipelined instruction execution allows subsequent instructions to begin execution before previously issued instructions have finished, so that execution of an instruction overlaps that of other instructions. Ideally, a new instruction begins with each clock cycle, and subsequently moves through a pipeline stage with each cycle. Because the work of executing a single instruction is broken up into smaller fragments, each executing in a single clock cycle, it may be possible to increase the clock speed. Even though an instruction may take multiple cycles or pipeline stages to complete, if the pipeline is always full, the processor executes one instruction every cycle.

Some modern high-performance processor designs, sometimes known as "superscalars," have extended the pipeline concept, to employ multiple parallel pipelines, each operating concurrently on separate data. Under ideal conditions, each instruction simultaneously causes data to be operated upon in each of the parallel pipelines, and thus there is a potential throughput multiplier equal to the number of pipelines, although in reality this is only a theoretical limit, it being impossible to keep all pipelines full at all times.

In one variation of a parallel pipeline design, known as "Single Instruction, Multiple Data" (SIMD), each instruction contains a single operation code applicable to each of a set of parallel pipelines. While each pipeline performs operations on separate data, the operations performed are not independent. Generally, each pipeline performs the same operation, although it may be possible that some instruction op codes dictate that specific pipelines perform different specific operations.

In another variation of a parallel pipeline design, known as "Multiple Instruction, Multiple Data" (MIMD), each instruction contains separate and independent operation codes for each respective pipeline, each set applicable to a different respective pipeline. When compared with a SIMD design, the MIMD design permits greater flexibility during execution and generally higher utilization of the pipelines, because each pipeline can perform independent operations. But, the need to specify different operations for each pipeline in the instruction substantially increases the length of the instruction, and increases the complexity of the hardware necessary to support an MIMD design. As a result of these countervailing considerations, neither of these two approaches is clearly superior to the other, although SIMD designs appear to be more widely used at the present time.

A multiple parallel pipeline processor, whether employing a SIMD or MIMD design, is an enormously complex device. The multiple pipelines require relatively large integrated circuit chip areas of primarily custom logic. These circuits within these pipelines have a high degree of switching activity, and consume considerable power at the operating frequencies typical of such devices. The power density, i.e., the amount of power consumed per unit area of chip surface, tends to be significantly greater within the pipelines than in many other areas of the processor chip, such as cache arrays and registers. This high level of activity and high power consumption makes the multiple pipeline area of the processor chip particularly susceptible to failure.

In a conventional multiple parallel pipeline processor, the failure of any part of a pipeline (even though the failure affects only a single pipeline) generally means that the processor is no longer able to process the instructions, since the instructions assume that all operands will simultaneously be processed by their respective pipelines. Therefore, the entire processor is effectively disabled. This may in turn cause system failure, although in some multiple-processor computer systems, the system can continue to operate, albeit at a reduced throughput, using the remaining functioning processors.

The complexity of multiple-processor computer systems with multiple parallel pipelines is exacerbated by the use of SMT (Simultaneous Multi-Threading) and SMP (Symmetric Multi-Processing). SMP refers to the execution of two threads simultaneously on two single-threaded processors. SMT refers to the execution of two threads simultaneously on one physical processor that has two logical processors. Thus, using SMT and SMP, as threads move back and forth among heterogeneous processors in a network, a processor may be running object code for which it was not originally developed and tested. Further, SMT and SMP tend to expose latent non-functional conditions in processors such as relative cache misses, timing-window related errors, and latent untested dis-functional sequences. These types of errors are very difficult to reproduce and determine the source since often simply retrying the failing sequence will not reproduce the error.

In order to increase the success and acceptability of multiple-pipeline processor designs, a need exists for a better way to handle error reproduction and problem determination.

SUMMARY

A method, apparatus, system, and signal-bearing medium are provided that in an embodiment detect an error, disable selected functions of a computer system via inhibit switches in response to the error, issue a set of diagnostic instructions to a processor, and incrementally enable the selected functions until the error is reproduced. In this way, the source of the error may be determined.

DETAILED DESCRIPTION

Figure 1:
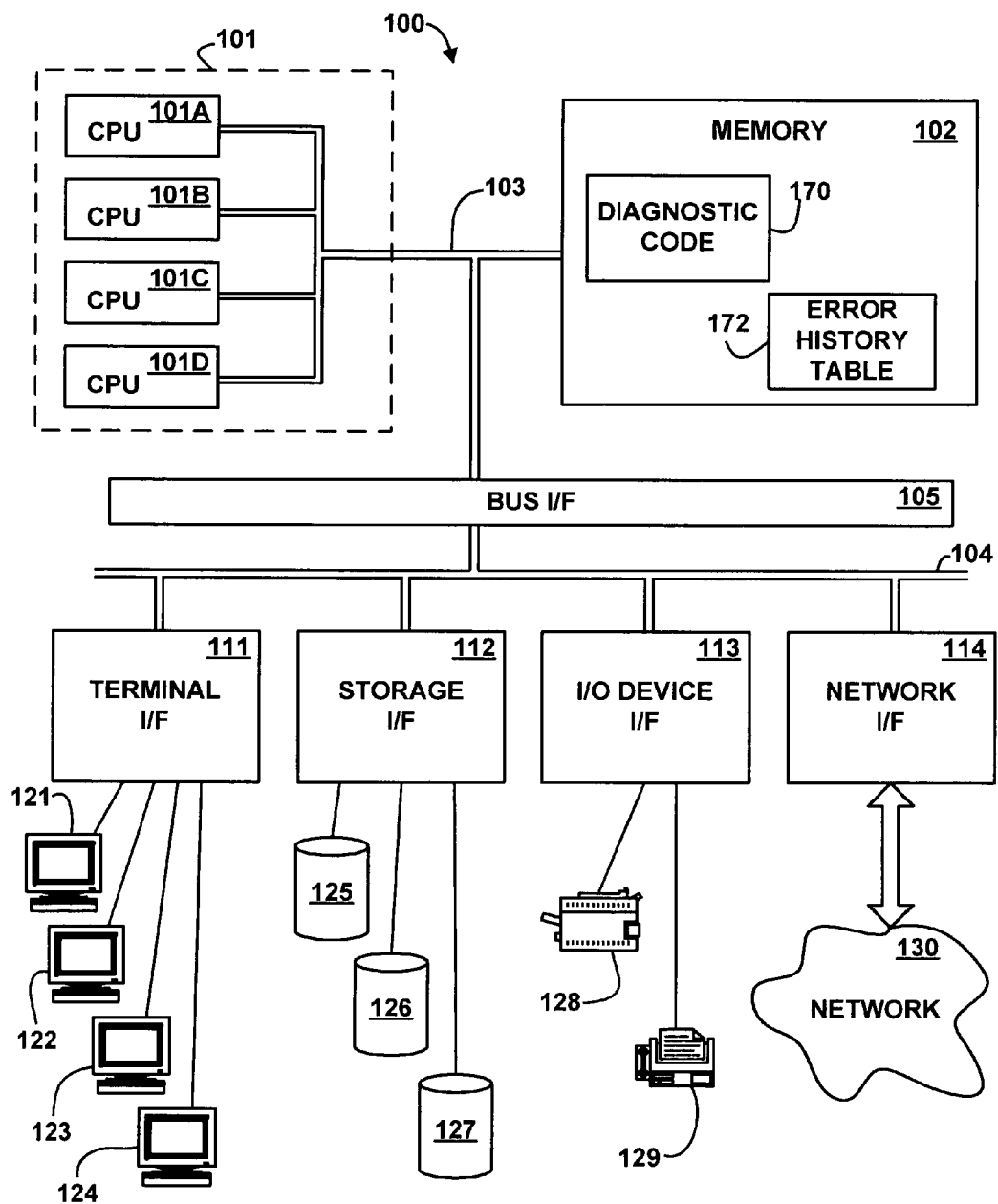
FIG. 1 depicts a high-level block diagram of a computer system that utilizes inhibit switches, according to an embodiment of the present invention.

Referring to the Drawing, wherein like numbers denote like parts throughout the several views, FIG. 1 is a high-level representation of a computer system 100 utilizing a multiple parallel pipeline processor, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and a bus interface 105.

The computer system 100 contains one or more general-purpose programmable central processing units (CPUs) 101A, 101B, 101C, and 101D, herein generically referred to as processor 101. In an embodiment, the computer system 100 contains multiple processors typical of a relatively large system; however, in another embodiment the computer system 100 may alternatively be a single CPU system. Each processor 101 executes instruction stored in the main memory 102, and may include one or more levels of on-board cache. The processors 101 are further described below with reference to FIG. 2.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices.

The memory bus 103 provides a data communication path for transferring data among the CPUs 101, the main memory 102, and the I/O bus interface unit 105. The I/O bus interface 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology. The I/O interface units support communication with a variety of storage and I/O devices. For example, the terminal interface unit 111 supports the attachment of one or more user terminals 121, 122, 123, 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein; it being understood that these are by way of example only and are not necessarily the only such variations.

Although the main memory 102 is shown in FIG. 1 as a single monolithic entity, the main memory 102 may in fact be distributed and/or hierarchical, as is known in the art. E.g., memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The main memory 102 includes diagnostic code 170 and an error history table 172. In an embodiment, the diagnostic code 170 includes instructions capable of executing on the CPUs 101 or statements capable of being interpreted by instructions executing on the CPUs 101 to perform the functions as further described below with reference to FIGS. 3 and 4. In another embodiment, the diagnostic code 170 may be implemented in hardware via logic gates and/or other appropriate hardware techniques. The error history table 172 stores information about errors that have occurred in the computer system 100. The error history table 172 is further described below with reference to FIGS. 3 and 4.

Although the memory bus 103 is shown in FIG. 1 as a relatively simple, single bus structure providing a direct communication path among the CPUs 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

While various system components have been described and shown at a high level, it should be understood that a typical computer system contains many other components not shown, which are not essential to an understanding of the present invention.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more CPUs 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
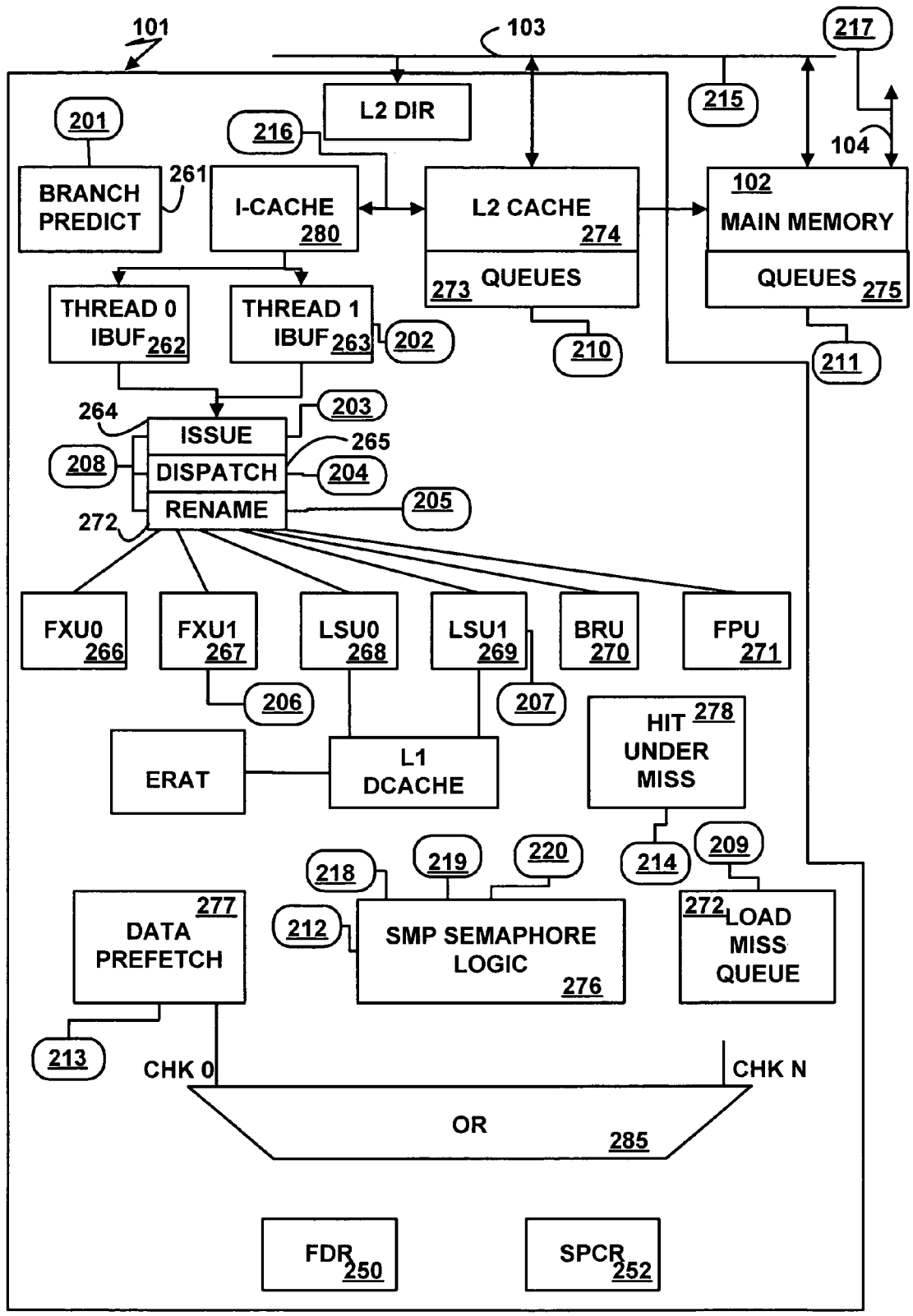
FIG. 2 depicts a high-level block diagram of the major hardware components of the computer system that utilizes inhibit switches, according to an embodiment of the invention.

FIG. 2 is a high-level diagram of the major components of the processor 101 connected to the main memory 102 via the memory bus 103, according to an embodiment. In an embodiment, the components shown in FIG. 2 are packaged in a single semiconductor chip, but in other embodiments the components of the processor 101 may be implemented in any number of chips. In an embodiment, the processor 101 is a Single Instruction, Multiple Data (SIMD) processor. In another embodiment, the processor 101 is a Multiple Instruction, Multiple Data (MIMD) processor, also known as a Very Long Instruction Word (VLIW) or Wide Issue Superscalar, in which the instruction contains multiple independent operation codes, each corresponding to a respective pipeline.

The processor 101, the main memory 102, the memory bus 103, and the I/O bus 104 include respective inhibit switches 201–220, which in an embodiment are latches that selectively control gates to enable or disable functions in the processor 101, the main memory 102, the memory bus 103, and the I/O bus 104. Inhibit switches, also known as chicken switches, are implemented in an embodiment in first chip hardware for test and debug and are normally abandoned later. But, in other embodiments, the inhibit switches may be present in any hardware. The chicken switches or inhibit switches can be used in embodiments of the invention for little additional cost.

The inhibit switch 201 is connected to a branch prediction unit 261 and enables or disables branch prediction. The inhibit switch 202 is connected to a thread1 instruction buffer 263 and enables or disables SMT.

The inhibit switch 203 is connected to an issue unit 264 and enables or disables parallel issue. The issue unit 264 determines what set of instructions from the thread0 instruction buffer 262 and the thread1 instruction buffer 263 are put in the pipe for each processor cycle.

The inhibit switch 204 is connected to a dispatch unit 265 and enables or disables parallel dispatch. The dispatch unit 265 sends the instructions to the appropriate units, such as the FXU0 (fixed-point unit 0) 266, the FXU1 (fixed-point unit 1) 267, the LSU0 (load/store unit 0) 268, the LSU1 (load/store unit 1) 269, the BRU (branch unit) 270, or the FPU (floating-point unit) 271.

The inhibit switch 205 is connected to a rename unit 272 and enables or disables register rename. The rename unit 272 is used in out-of-order processors, provides a double set of register names, allows instructions to be executed early, and puts the target of the instructions in a special register. When an instruction is executed out-of-order, it is not allowed to modify the architected register, so it instead modifies a shadow register.

The inhibit switch 206 is connected to the FXU1 (fixed-point unit 1) 267 and enables or disables the FXU1 267. The inhibit switch 207 is connected to the LSU1 269 and enables or disables the LSU1 269. The inhibit switch 208 is connected to the issue unit 264, the dispatch unit 265, and the rename unit 272 and enables or disables out-of-order processing.

The inhibit switch 209 is connected to a load miss queue 272 and enables or disables miss queuing L1 (level 1). The inhibit switch 210 is connected to the queues 273 of a L2 (level 2) cache 274 and enables or disables parallel L2 accesses. The inhibit switch 211 is connected to the queues 275 of the main memory 102 and enables or disables parallel main memory 102 accesses.

The inhibit switch 212 is connected to SMP semaphore logic 276 and enables or disables stall pipeline on semaphores. The inhibit switch 213 is connected to a data prefetch unit 277 and enables or disables data prefetch. The inhibit switch 214 is connected to a hit under miss unit 278 and enables or disables DCache (data cache) Hit Under Miss.

The inhibit switch 215 is connected to the memory bus 103 and enables or disables serial SMP Bus Request/Responses. The inhibit switch 216 is connected to the ICache (instruction cache) 280 and the L2 Cache 274 (includes both instructions and data) and enables or disables instruction prefetch. The inhibit switch 217 is connected to the I/O bus 104 and enables or disables serializing I/O Bus Request/Responses. The inhibit switch 218 is connected to the SMP semaphore logic 276 and enables or disables firm consistency. The inhibit switch 219 is connected to the SMP semaphore logic 276 and enables or disables strong consistency. The inhibit switch 220 is connected to the SMP semaphore logic 276 and enables or disables pad instruction sequences. The inhibit switches 201–220 are examples only, and in other embodiments any inhibit switches that selectively enable or disable any functions in the processor 101, the main memory 102, the memory bus 103, and/or the I/O bus 104 may be used.

The processor 101 further includes a FDR (Function Disable Register) 250, which controls the inhibit switches 201–220 and determines whether each of the inhibit switches 201–220 are enabled or disabled. In an embodiment, the FDR 250 includes a bit for each of the inhibit switches 201–220. If a bit in the FDR 250 is set to one, the corresponding inhibit switch is enabled and the corresponding function is enabled. If a bit in the FDR 250 is set to zero, the corresponding inhibit switch is disabled and the corresponding function is disabled. Thus, a value of all ones in the FDR is the run default, meaning all of the functions corresponding to the inhibit switches 201–220 are enabled. The diagnostic code 170 (FIG. 1) controls which bits in the FDR 250 are set and thus controls which of the functions corresponding to the inhibit switches 201–220 are enabled or disabled.

In various embodiments, every element or N select elements in the processor 101, the main memory 102, the memory bus 103, and the I/O bus 104 have error checking which feeds information identifying the errors detected into the OR unit 285. The diagnostic code 170 saves the output of the OR unit 285 in the error history table 172.

The processor 101 also includes SPRC (sequence pad control register) 252, which introduces extra variables in addition to the inhibit switches 201–220 in an attempt to recreate the error. If doing bus operations, the sequence pad control register 252 can introduce extra delay on the memory bus 103 or the I/O bus 104. For example, if normally the bus takes ten processor cycles to complete a bus operation, the sequence pad control register 252 can increase the number of cycles to twenty in an attempt to lower the activity level. The activity level can gradually be raised later. In various embodiments, the sequence pad control register 252 can slow the issue rate down in a pipeline, force bus transactions to take longer, and increase cache latency. But, the sequence pad control register 252 is not restricted to the aforementioned examples and can be applied generally to introduce delay in any function of the processor 101, the memory bus 103, and/or the I/O bus 104.

Based on the errors stored in the error history table 172, the diagnostic code 170 selectively determines which of the functions in the processor 101, the main memory 102, the memory bus 103, and the I/O bus 104 to enable or disable via the inhibit switches 201–220. The diagnostic code 170 then iteratively runs a test suite of instructions against the processor 101 and incrementally enables or disables different functions via the FDR 250 and the inhibit switches 201–220 until the error is reproduced.

In an embodiment, the diagnostic code 170 sets the processor 101 in a serial mode with only one instruction in the pipe and all the functions disabled via the inhibit switches 201–220 and the FDR 250 and all other processors disabled. The diagnostic code 170 then incrementally turns on functions in the processor 101 via the FDR 250 until the error is reproduced. If the error is not reproduced, the diagnostic code 170 then turns on other of the CPUs 101 until the error is reproduced.

While various components of the processor 101 have been described and shown at a high level, it should be understood that the processor 101 may contain other components not shown, which are not essential to an understanding of the present invention. For example, various additional special purpose registers will be required in a typical design. Furthermore, it will be understood that the processor 101 of FIG. 2 is simply one example of a processor architecture, and that many variations could exist in the number, type and arrangement of components within the processor 101, that components not shown may exist in addition to those depicted, and that not all components depicted might be present in a processor design. For example, the number and configuration of buffers and caches may vary; the number and function of execution unit pipelines may vary; registers may be configured in different arrays and sets; and dedicated floating point hardware may or may not be present.

Figure 3:
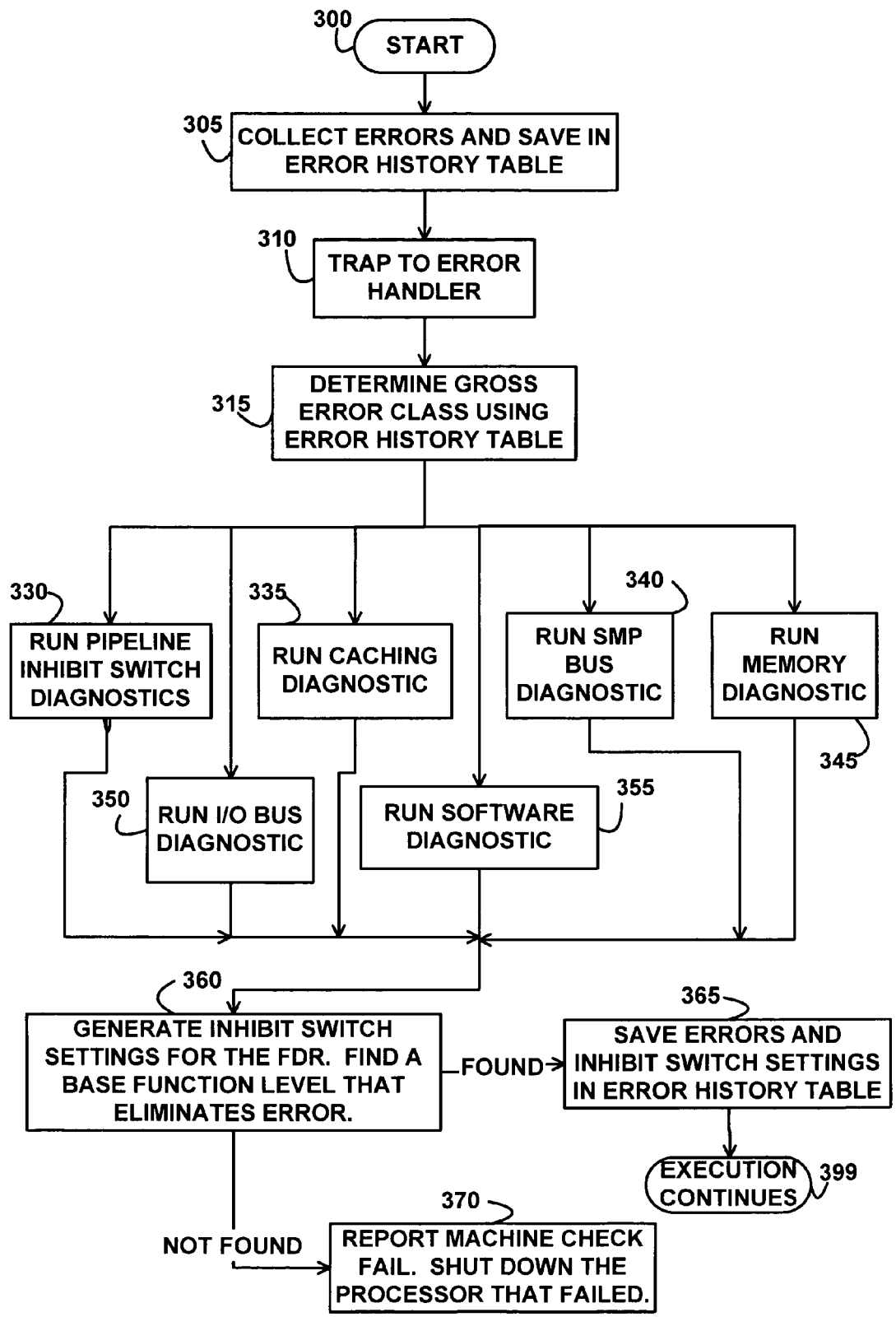
FIG. 3 depicts a high-level flowchart of a process that utilizes inhibit switches, according to an embodiment of the invention.

FIG. 3 depicts a high-level flowchart of a process that utilizes the inhibit switches 201–220 (FIG. 2), according to an embodiment of the invention. Control begins at block 300. Control then continues to block 305 where the diagnostic code 170 collects errors from the various elements of the CPUs 101, the main memory 102, the memory bus 103, and the I/O bus 104 via the OR unit 285 and saves the errors in the error history table 172. Control then continues to block 310 where an error at the CPUs 101, the main memory 102, the memory bus 103, or the I/O bus 104 causes the diagnostic code 170 to be invoked.

Control then continues to block 315 where the diagnostic, code 170 determines a gross error class using the errors stored in the error history table 172. Based on the determined gross error class, the diagnostic code 170 then determines a set of diagnostic instructions to issue to the processor 101 and a set of functions to disable in the processor 101, the main memory 102, the memory bus 103, and/or the I/O bus 104. Examples of sets of diagnostic instructions in various embodiments may be pipeline diagnostic instructions, caching diagnostic instructions, memory bus diagnostic instructions, memory diagnostic instructions, I/O bus diagnostic instructions, or software diagnostic instructions. Control then continues to one of blocks 330, 335, 340, 345, 350, or 355, depending on the set of diagnostic instructions that was previously determined at block 315. At each of blocks 330, 335, 340, 345, 350, and 355, the diagnostic code 170 issues the corresponding determined set of diagnostic instructions to the processor 101 and sets the FDR 250 to inhibit the selected functions via the inhibit switches 201–220.

Control then continues to block 360 where the diagnostic code 170 finds a base level of function where the error is eliminated and iteratively adds more function via the inhibit switches 201–220 until the error is reproduced while issuing the diagnostic instructions to the processor 101. If the base function level that eliminates the error is found, then control continues from block 360 to block 365 where the diagnostic code 170 saves the errors encountered and the inhibit switch settings present when the errors occurred to the error history table 172. Control then continues to block 399 where execution continues. If the base function level that eliminates the error is not found then control continues from block 360 to block 370 where the diagnostic code 170 reports a machine check failure, and the processor that failed is shut down.

Figure 4:
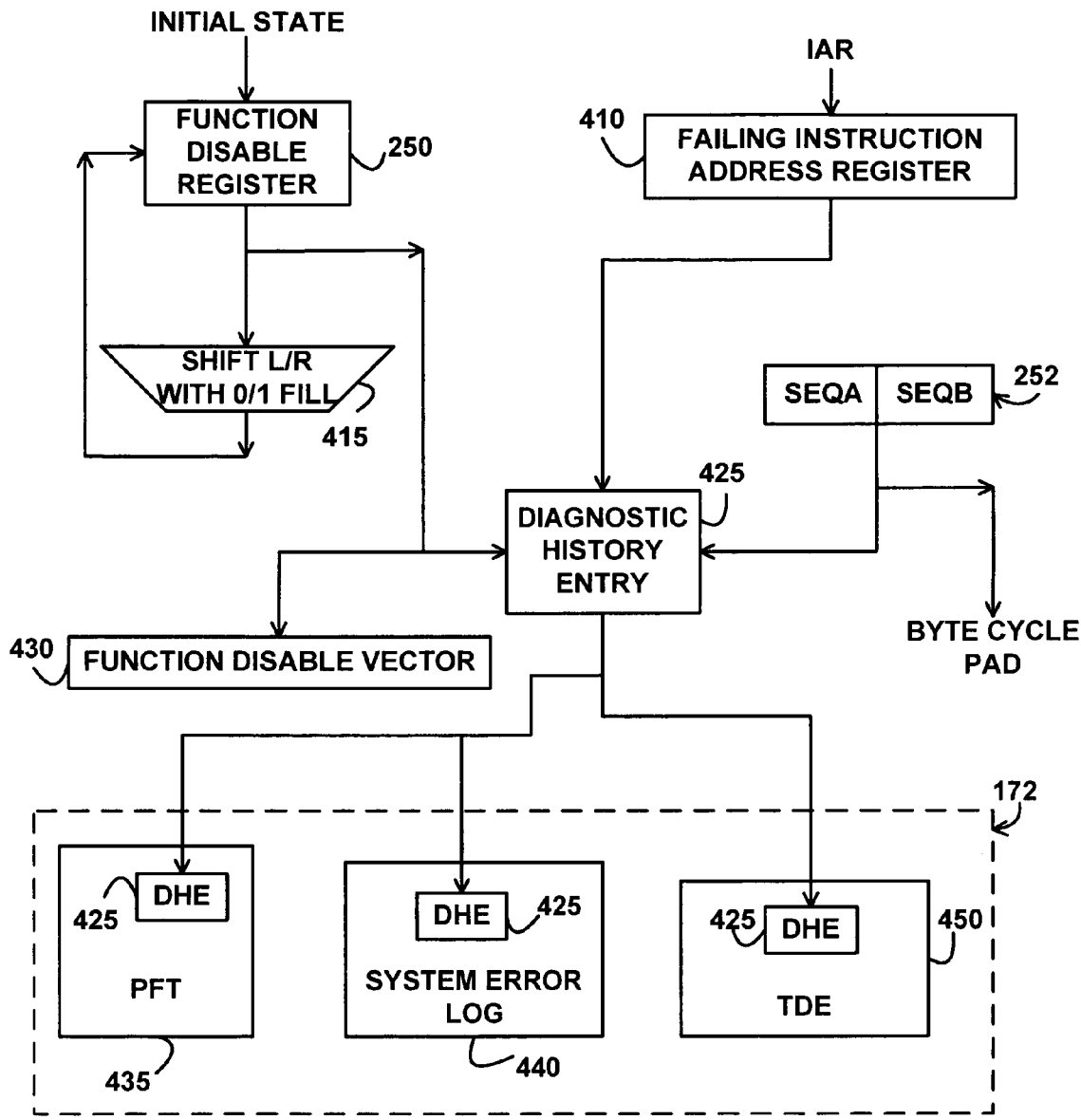
FIG. 4 depicts a block diagram of select components that utilize the inhibit switches, according to an embodiment of the invention.

FIG. 4 depicts a block diagram of select components of the computer system 100 that utilize the inhibit switches 201–220 (FIG. 2), according to an embodiment of the invention. The diagnostic code 170 sets the initial state of the function disable register 250, which sends its contents as a function disable vector 430 to the various inhibit switches 201–220 (FIG. 2). The function disable vector 430 is also stored in a diagnostic history entry 425. In an embodiment, the diagnostic code 170 incrementally changes the contents of the function disable register 250 via a shift left/right with 0/1 fill unit 415. In an embodiment, shift left with 0 fill incrementally turns off the inhibit switches and shift right with 1 fill incrementally turns inhibit switch bits on.

If the error cannot be reproduced with a diagnostic routine, it is logged and the next occurrence of an error of the same type will reference the log to determine how the FDR and SPRC should be set to attempt to eliminate the error from occurring again.

When an error occurs, the instruction that was executing at the time of the error is saved in a failing instruction address register 410 and stored in the diagnostic history entry 425. The state of the SPCR (Sequence Pad Control Register) 252 and is also stored in the diagnostic history entry 425.

The diagnostic code 170 stores the diagnostic history entry 425 in the error history table 172, which may in various embodiments be part of the PFT (page frame table) 435, the system error log 440, or the TDE (Task Dispatch Element) 450. The page frame table 435 does virtual to real address translation and is a global facility used by all the CPUs 101.

The contents of the sequence pad control register 252 is input to the diagnostic code 170 as a byte cycle pad, which the diagnostic code 170 uses to determine the gross error class, as previously described above with reference to FIG. 3.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   disabling selected functions of a computer system in response to an error;
   selecting a set of diagnostic instructions based on a history of errors encountered by the computer system;
   issuing the set of diagnostic instructions to a processor in the computer system; and
   incrementally enabling the selected functions until the error is reproduced.

2. The method of claim 1, wherein the selecting further comprises:
   selecting the set based on a class of the error.

3. The method of claim 1, wherein the disabling further comprises:
   setting a function disable register that is connected to a plurality of inhibit switches.

4. An apparatus comprising:
   means for disabling selected functions of a computer system in response to an error;
   means for selecting a set of diagnostic instructions based on a history of errors encountered by the computer system;
   means for issuing the set of diagnostic instructions to a processor in the computer system; and
   means for incrementally enabling the selected functions until the error is reproduced.

5. The apparatus of claim 4, wherein the means for selecting further comprises:
   means for selecting the set based on an error class.

6. The apparatus of claim 4, wherein the means for disabling further comprises:
   means for setting a function disable register that is connected to a plurality of inhibit switches.

7. The apparatus of claim 6, further comprising:
   means for saving status of the function disable register and the error in a history table after the error is reproduced.

8. A storage medium encoded with instructions, wherein the instructions when executed comprise:
   detecting an error;
   disabling selected functions of a computer system in response to the error;
   selecting a set of diagnostic instructions based on a history of errors encountered by the computer system;
   issuing the set of diagnostic instructions to a processor; and
   incrementally enabling the selected functions until the error is reproduced.

9. The storage medium of claim 8, wherein the selecting further comprises:
   selecting the set based on an error class.

10. The storage medium of claim 8, wherein the disabling further comprises:
    setting a function disable register that is connected to a plurality of inhibit switches.

11. The storage medium of claim 10, further comprising:
    saving status of the function disable register and the error in a history table after the error is reproduced.

12. A computer system comprising:
    a processor;
    a sequence pad control register to introduce delay into selected operations of the computer system;
    a plurality of inhibit switches to selectively enable and disable a corresponding plurality of functions of the processor,
    a function disable register to control the plurality of inhibit switches; and
    a shift unit to incrementally change the contents of the function disable register.

13. The computer system of claim 12, further comprising:
    a diagnostic history entry comprising contents of a failing instruction address register, contents of the function disable register, and contents of the sequence pad register.

14. The computer system of claim 12, further comprising:
    a memory connected to the processor; and
    an additional inhibit switch to selectively enable and disable a function of the memory, wherein the function disable register is to control the additional inhibit switch.

15. The computer system of claim 12, further comprising:
    a bus connected to the processor; and
    an additional inhibit switch to selectively enable and disable a function of the bus, wherein the function disable register is to control the additional inhibit switch.

* * * * *